United States Patent [19]
Edwards

[11] Patent Number: 6,078,815
[45] Date of Patent: Jun. 20, 2000

[54] METHOD AND APPARATUS FOR ALLOCATING RADIO CHANNELS

[75] Inventor: Keith Russell Edwards, Paignton, United Kingdom

[73] Assignee: Nortel Networks Corporation, Montreal, Canada

[21] Appl. No.: 08/957,267

[22] Filed: Oct. 23, 1997

[51] Int. Cl.[7] .................................................. H04Q 7/26
[52] U.S. Cl. ...................... 455/450; 455/422; 455/447; 455/440; 455/524
[58] Field of Search .................................... 455/447, 446, 455/448, 450, 451, 452, 456, 440, 524, 422, 522, 69

[56] References Cited

U.S. PATENT DOCUMENTS

| | | | |
|---|---|---|---|
| 5,365,571 | 11/1994 | Rha et al. ................................ | 455/446 |
| 5,491,837 | 2/1996 | Haartsen ............................... | 455/450 X |
| 5,574,974 | 11/1996 | Almgren et al. ....................... | 455/450 |
| 5,613,200 | 3/1997 | Hamabe .................................. | 455/450 |
| 5,778,318 | 7/1998 | Talarmo et al. ....................... | 455/452 |
| 5,787,352 | 7/1998 | Benveniste .............................. | 455/452 |
| 5,835,859 | 11/1998 | Doner ..................................... | 455/447 |
| 5,844,894 | 12/1998 | Dent ....................................... | 455/447 |
| 5,859,841 | 1/1999 | Gitlits ................................... | 455/447 X |

*Primary Examiner*—Daniel S. Hunter
*Assistant Examiner*—Yemane Woldetatios
*Attorney, Agent, or Firm*—Lee, Mann, Smith, McWilliams, Sweeney & Ohlson

[57] ABSTRACT

A fixed wireless access communication network is described. The capacity of a fixed wireless access network is limited by the number of radio frequencies and hence the numberof channels available. The present invention prepares a solution to this problem whenever the radio channels are transmitted at one of at least two power levels.

16 Claims, 4 Drawing Sheets

N=7

N=7

N = 3,9

METHOD AND APPARATUS FOR ALLOCATING RADIO CHANNELS

FIELD OF THE INVENTION

This invention relates to a radio communications system and in particular relates to a method for allocating radio channels in a fixed wireless access system.

BACKGROUND TO THE INVENTION

Fixed wireless access systems are currently employed for local telecommunication networks, such as the IONICA system. Known systems comprise an antenna and decoding means which are located at a subscriber's premises, for instance adjacent a telephone. The antenna receives the signal and provides a further signal by wire to a decoding means. Thus subscribers are connected to a telecommunications network by a radio link in place of the more traditional method of copper cable. Such fixed wireless access systems will be capable of delivering a wide range of access services from POTS (public operator telephone service), ISDN (integrated services digital network) to broadband data. The radio transceivers at the subscribers premises communicate with a base station, which provides cellular coverage over, for example, a 5 km radius in urban environments. A typical base station will support 500–2000 subscribers. Each base station is connected to a standard PSTN switch via a conventional transmission link/network.

When a fixed wireless access telecommunications system is initially deployed, then a base station of a particular capacity will be installed to cover a particular populated area. The capabilities of the base station are designed to be commensurate with the anticipated coverage and capacity requirement. Subscribers' antennas will be mounted outside, for instance, on a chimney, and upon installation will normally be directed towards the nearest (or best signal strength) base station or repeater antenna (any future reference to a base station shall be taken to include a repeater). In order to meet the capacity demand, within an available frequency band allocation, fixed wireless access systems divide a geographic area to be covered into cells. Within each cell is a base station through which the subscriber' stations communicate; the distance between the cells being determined such that co-channel interference is maintained at a tolerable level. When the antenna on the subscriber premises is installed, an optimal direction for the antenna is identified using monitoring equipment. The antenna is then mounted so that it is positioned towards the optimal direction.

There are a number of alternative ways of providing access to the public telephone network, besides fixed wireless access systems. One method is to use copper or optical fibre cable. However, this involves digging up streets to order to lay cables past all the homes in the service area which is expensive, time consuming and causes noise, dirt, damage to trees and pavements and disrupts traffic. After the initial high investment the telephone company can then only start to recoup its investment as new subscribers join the system over a period of time. Another alternative is cellular radio such as GSM. This has the advantage that the telephones are mobile. However, the system operator has to provide continuous coverage along motorways, in shopping malls, and so on. The low-height omni directional antenna used in mobile systems gives little discrimination against multipath interference, and its low height makes it more susceptible to noise. Also, when a mobile moves it suffers constantly varying multipath interference which produces varying audio quality. Mobile cellular networks also require expensive backhaul networks which consist of expensive switches and an expensive master control centre which handle the movement of mobiles from one cell to another.

Radio systems based on mobile standards with fixed directional antennas are sometimes used to provide access to the public telephone network. The directional antenna discriminates against some of the multipath interference. However, the system still suffers from the disadvantages already mentioned. For example, an expensive backhaul network is required and the speech quality is inferior to a copper wire system.

Fixed wireless access systems comprise a basestation serving a radio cell of up to 15 km radius (for example). The basestation interfaces with the subscriber system via a purpose designed air interface protocol. The basestation also interfaces with the public telephone network for example, this interface can be the ITU G.703 2048 kbit/s, 32 timeslot, 30 channel standard known as E1 or the North American 24 timeslot standard known as T1.

Typically, each uplink radio channel (i.e. from a subscriber antenna to a base station) is paired with a downlink radio channel (i.e. from a base station to a subscriber antenna) to produce a duplex radio channel. For voice signals the up and down link channels in a pair normally have the same frequency separation (e.g. 50 MHz between uplink and downlink channels) because this makes the process of channel allocation simple. However, it is possible for the up and down link channels in a pair to have different frequency separations. Often each downlink transmits continuously and it is usual for those downlink bearers used to carry broadcast information to transmit continuously. In the uplink each subscriber antenna typically only transmits a packet of information when necessary.

A bearer is a frequency channel, often with several logical channels, for example, ten channels. Basestations are then allocated radio bearers from the total available, for example, 54. As the subscriber population increases the basestation capacity can be increased by increasing the number of bearers allocated to it, for example, 3, 6 or 18 bearers.

As already mentioned, fixed wireless access systems divide a geographic area to be covered into cells. For initial planning and design purposes these cells are usually represented as hexagons, each cell being served by a base station (in the centre of the hexagon) with which a plurality of subscriber stations within the cell (hexagon) communicate. When detailed cell planning is performed the ideal hexagonal arrangement can start to break down due to site constraints or for radio propagation reasons. The number of subscriber stations which can be supported within each cell is limited by the available number of carrier frequencies and the number of channels per frequency.

Base stations are expensive, and require extensive effort in obtaining planning permission for their erection. In some areas, suitable base station sites may not be available. One problem in fixed wireless access system design is to have as few base stations as possible, whilst supporting as many subscriber stations as possible. This helps to reduce the cost per subscriber in a fixed wireless access system. An on-going problem is to increase the traffic carrying capacity of base stations whilst at the same time keeping interference levels within acceptable bounds. This is referred to as trying to optimise or increase the carrier to interference level ratio. By increasing the traffic capacity the number of lost or blocked calls is reduced and call quality can be improved. (A lost call is a call attempt that fails.)

Cells are typically grouped in clusters as shown in FIG. 1. In this example, a cluster of seven cells is shown and for a 6 bearer system, each cell in the cluster may use a different group of 6 frequencies out of the total available (for example, 54). Within each cluster 7×6=42 frequencies are each used once. This leaves 12 channels for in-fill if required. Within the cluster all channels are orthogonal, that is, separated by emitter time and/or frequency, and therefore there will be no co-channel interference within this isolated cluster.

FIG. 2 shows how a larger geographical area can be covered by re-using frequencies. In FIG. 2 each frequency is used twice, once in each cluster. Co-channel interference could occur between cells using the same frequencies and needs to be guarded against through cell planning. When the capacity of a cell or cluster is exhausted one possibility is to sectorize each cell. This involves using directional antennas on the base station rather than omnidirectional antennas. The 360° range around the base station is divided up into a number of sectors and bearers are allocated to each sector. In this way more bearers can be added whilst keeping interference down by only using certain frequencies in certain directions or sectors. For example, up to 12 bearers per cell could be added giving a total of 18 bearers and thereby tripling the capacity of each cell (as shown in FIG. 3). With 18 bearers per cell, the number of cells in a cluster drops to three, as shown in FIG. 3. This is because all 54 frequencies are used in the cluster and will be reused in other clusters.

Known approaches for seeking to increase system capacity include frequency planning which involves carefully planning re-use patterns and creating sector designs in order to reduce the likelihood of interference. However, this method is complex and difficult and there is still the possibility that unwanted multipath reflections may cause excessive interference. Frequency planning is also expensive and time consuming and slows down the rate of deployment. Some of the difficulties with frequency planning include that it relies on having a good terrain base and a good prediction tool.

OBJECT OF THE INVENTION

The present invention seeks to provide a method and apparatus for allocating radio channels in a fixed wireless access system which overcomes or at least mitigates one or more of the problems noted above. It is sought to increase the traffic carrying capacity of base stations whilst at the same time keeping interference levels to a minimum.

SUMMARY OF THE INVENTION

According to a first aspect of the present invention there is provided a method of radio channel allocation in a fixed wireless access communications network, said network comprising:

(i) a base station;
(ii) a plurality of subscriber stations; and wherein the base station and the subscriber stations are adapted such that communication between the base station and the subscriber stations is achieved in use, using one of a number of radio channels, each radio channel having a different frequency; and wherein each radio channel is transmitted at one of at least two power levels, said method comprising the step of: allocating a radio channel for use in communicating between one of the subscriber stations and the base station according to the distance of the subscriber station from the base station, such that in use, channel frequencies of channels transmitted at relatively low power levels can be used again to establish communication between a subscriber and a second base station at a distance closer to the first base station than otherwise would have been possible.

A corresponding apparatus, for radio channel allocation in a fixed wireless access communications network is also provided, said network comprising (i) a base station;
(ii) a plurality of subscriber stations; and wherein the base station and the subscriber stations are adapted such that communication between the base station and the subscriber stations is achieved in use, using one of a number of radio channels, each radio channel having a different frequency; and wherein each radio channel is transmitted at one of at least two power levels, said apparatus comprising:
an allocator arranged to allocate a radio channel for use in communicating between one of the subscriber stations and the base station according to the distance of the subscriber station from the base station, such that in use, channel frequencies of channels transmitted at relatively low power levels can be used again to establish communication between a subscriber and a second base station at a distance closer to the first base station than otherwise would have been possible.

The invention also encompasses a corresponding fixed wireless access communications network comprising:

(i) a base station;
(ii) a plurality of subscriber stations, wherein the base station and the subscriber stations are adapted such that communication between the base station and the subscriber stations is achieved in use, using one of a number of radio channels, each radio channel having a different frequency; and wherein each radio channel is transmitted at one of at least two power levels,
(iii) an allocator arranged to allocate a radio channel for use in communicating between one of the subscriber stations and the base station according to the distance of the subscriber station from the base station, such that in use, channel frequencies of channels transmitted at relatively low power levels can be used again to establish communication between a subscriber and a second base station at a distance closer to the first base station than otherwise would have been possible.

Advantageously, by transmitting channels at different power levels the area of coverage for different channels is varied. This provides the advantage that channel frequencies, for channels which have a low power level, can be re-used in a geographical area closer to the base station than otherwise would have been possible without causing significant co-channel interference. This helps to increase the capacity of the communications system. Also, because the system is used with a fixed wireless access communications system, where subscriber antennas are directed, interference is further reduced and this enables capacity to be increased to a greater extent than would otherwise be possible. For example, this provides the advantage, that for subscribers situated in a region that is encompassed by two adjacent cells, the antenna can be directed towards one of the two base stations, to reduce interference from the second base station. Another important advantage is that frequency planning is reduced and replaced by a process that can occur after installation. This process involves power balancing the carriers for optimum capacity. Frequency planning can be expensive and time consuming slowing down the rate of deployment. This method permits higher capacity and faster deployment.

Advantageously, the subscriber stations each comprise a subscriber antenna with at least one moveable antenna beam. In this way, for subscribers situated in the outer regions of a cell, where only the high power channels are available, the number of available channels can be increased by redirecting the antenna towards a base station in an adjacent cell.

Preferably, at least one subscriber station comprises two or more directional antennas. The antennas are each directed towards a different base station so that the number of available channels is increased by allowing communication to be established using any of the antennas. This also has the advantage that installation of the subscriber antennas is simplified because less time is needed to identify a preferred base station and antenna direction for a single antenna.

Preferably, the radio channels are downlink radio channels. This provides the advantage that capacity can be increased on the down link only. For example, when subscribers are accessing the internet, they send a request, of small size, on the uplink whereas they receive large amounts of information on the downlink (e.g. web pages). In this type of situation, greater capacity on the downlink is required than it is for the uplink. Also, because the uplink channels are limited by interference to a greater extent than the downlink channels it is advantageous for the radio channels to be downlink radio channels.

It is also preferred that the method of radio channel frequency allocation further comprises the steps of:

(i) transmitting packet data over the allocated channel;

(ii) checking the transmitted data for errors; and (iii) retransmitting any transmitted data in which errors are detected. This provides the advantage that when packet data is being communicated, then capacity can be increased whilst allowing retransmission to occur if there are errors in transmission of the packet data.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

The term "sector" is used to refer to a geographical area around a base station within which subscriber stations are able to communicate with the base station. Also, an "uplink" channel is a channel via which signals are transmitted from a subscriber to a base station. A "downlink" channel is a channel via which signals are transmitted from a base station to a subscriber station.

Figure 1:
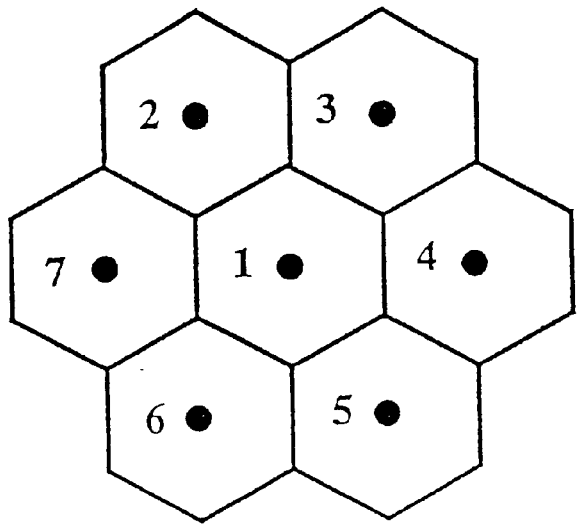
FIG. 1 shows a cluster of seven cells that are represented as hexagons.
Figure 2:
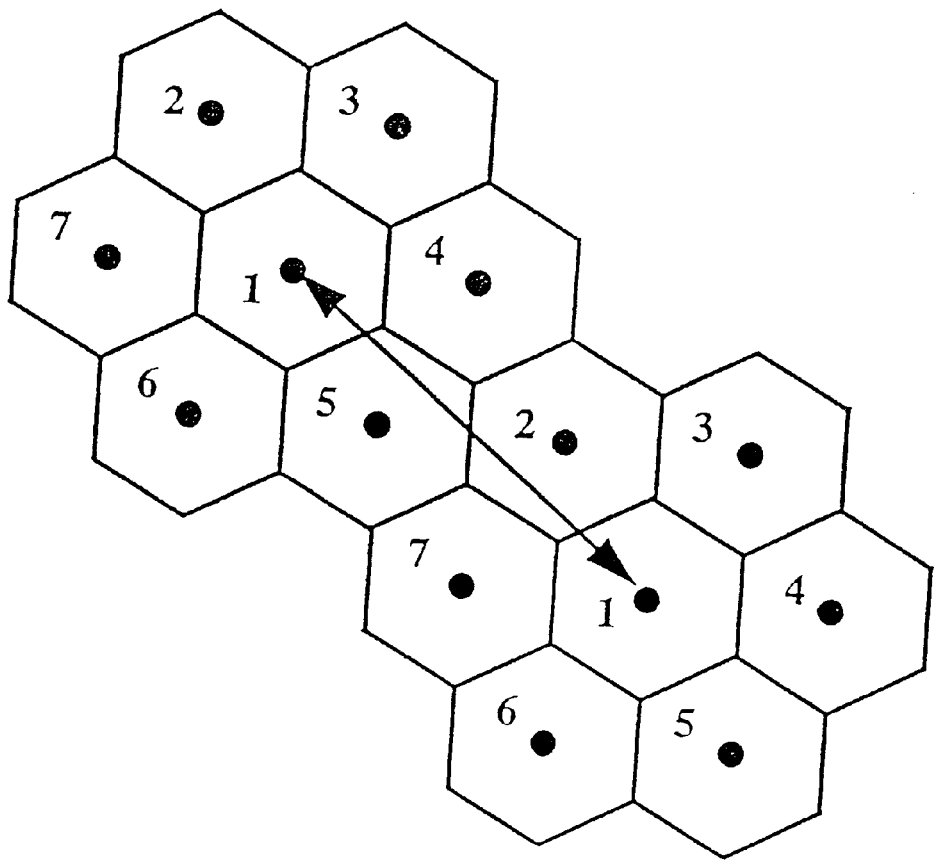
FIG. 2 shows two clusters of seven cells where each frequency is re-used twice, once in each cluster.
Figure 3A:
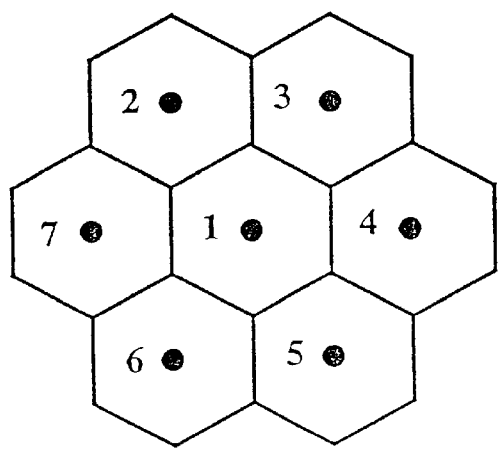
FIG. 3a shows a 6 bearer omni deployment with a cluster size of 7, using 42 frequencies out of the total available of 52.
Figure 3B:
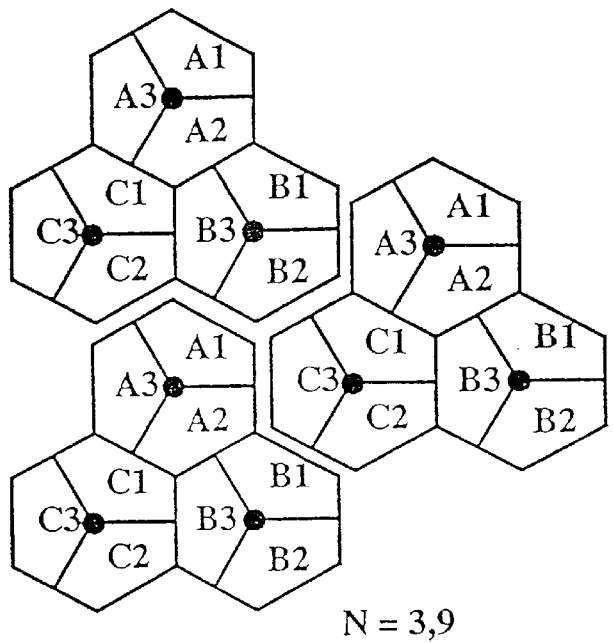
FIG. 3b shows the deployment of FIG. 3a after each cell has been sectorized by adding 12 bearers per cell giving a total of 18 bearers and tripling the capacity of each cell. The number of cells per cluster is now 3.
Figure 4:
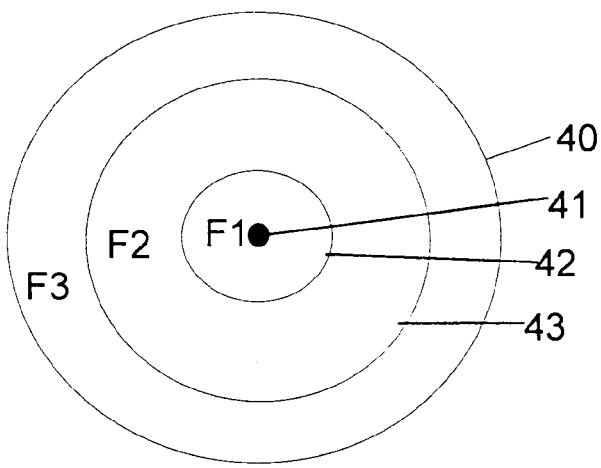
FIG. 4 is a schematic diagram of a cell with bearers of three frequencies.

By reducing the power at which a bearer is transmitted the area of coverage (or sector) for that bearer is reduced as is the interference caused to a more distant terminal in a reuse cell. For example, FIG. 4 shows a cell 40 with a base station 41. In this cell the lowest frequency bearers F3 are transmitted at the highest power, so that these bearers are available to subscribers positioned anywhere in the cell 40. The sector for the F3 bearers is then the whole cell. The highest frequency bearers F1 are transmitted at the lowest power and are only available to subscribers positioned within area 42 of the cell, i.e. close to the base station. Similarly, bearers at intermediate frequencies F2 are transmitted at an intermediate power and are available to subscribers between the base station and boundary 43. It is also possible for the bearers F3 to be the highest frequency bearers and for the bearers F1 to be the lowest frequency. Any suitable arrangement of frequencies between the sectors can be used.

Subscribers close to the base station (within boundary 42) have bearers of any of the frequencies available whereas subscribers between boundary 43 and the edge of the cell have fewer available bearers.

Because the power level for the inner sector 42 is reduced, the frequencies of the bearers in this sector can be re-used in a geographical area closer to the base station than otherwise would have been possible, without causing significant co-channel interference.

After installation of the communications system, the power levels of the channels are adjusted to improve capacity as described. This adjustment is effected by apparatus either in the base station itself or elsewhere in the communications network. For example, control can be effected from a central location such as a communications network management centre. Any suitable apparatus can be used as would be known to a skilled person in the art.

A method of channel allocation is then used which involves choosing an available channel with the lowest power level available and which gives an adequate quality or carrier to interference level ratio. This step involves searching all the available channels and can be carried out by apparatus within the base station or elsewhere in the communications network. Any suitable apparatus can be used for effecting the method such as would be known to a skilled person in the art. A channel that gives adequate quality is one that allows information to be transmitted without the introduction of a certain number, level or rate of errors. This method allows the number of channels available to more disadvantaged users in the system (those for which fewer channels are available) to be maximised.

One problem with this type of system, if used with a mobile telephone system, is that as a mobile station travels through a cell, it also passes between sectors and this affects the number of channels available to it at any one location. When in the inner sector of a cell, the mobile subscriber may be allocated a channel of a certain frequency and then, when the subscriber moves into the next sector, this frequency may no longer be available. To maintain communication the mobile subscriber needs to "hand over" between channels when he or she moves between sectors and this is inconvenient and unnecessarily complex.

Figure 5:
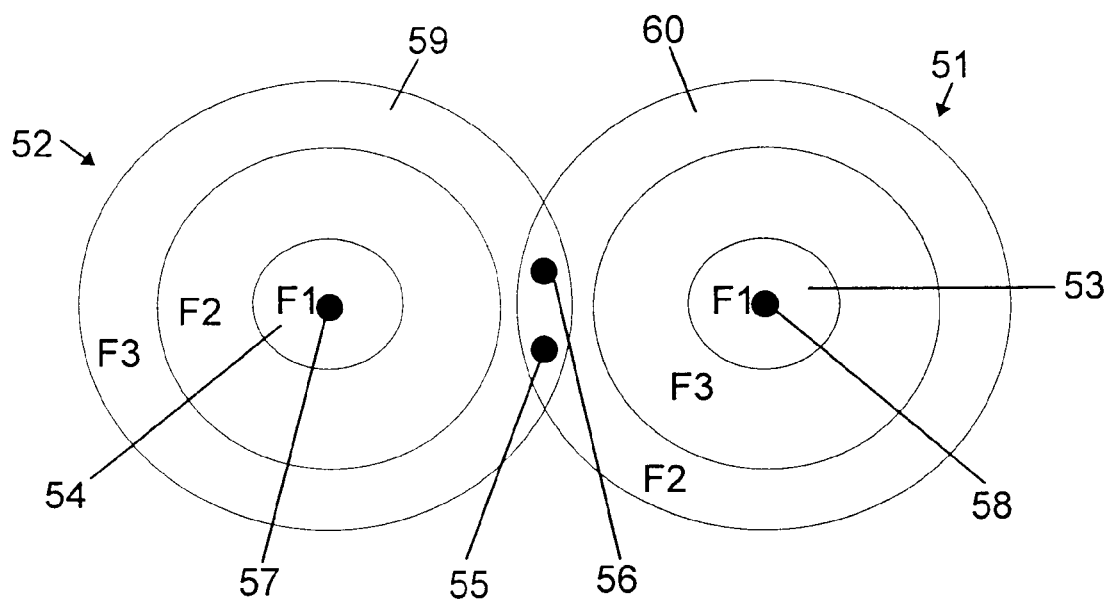
FIG. 5 is a schematic diagram of two adjacent cells.

FIG. 5 shows two adjacent cells 51, 52, each cell being similar to the cell of FIG. 4. For both cells the inner sector 53, 54 has channels transmitted at the lowest power level and the channel frequencies for inner sector 53 are re-used for the inner sector of the adjacent cell 54. For the outer sectors of cell 51 frequencies F3 and F2 are used (these can be frequency ranges) as shown, and for cell 52 the frequencies for the outer sectors are reversed as shown. This ensures that for a subscriber situated in the region of overlap between the two cells 55 the likelihood of co-channel interference is reduced. For example, for subscriber 56 signals from cell 51 will be in frequency range F2 whereas signal from cell 52 will be in frequency range F3. It is not essential to use the exact arrangement of frequencies or frequency ranges for the outer sectors as shown in FIG. 5. Other arrangements can be used which also reduce co-channel interference.

Because, in fixed wireless access systems, the subscriber stations are equipped with directional antennas, co-channel interference is further reduced. For example, if subscriber 56 in FIG. 5 has a directional antenna this can be directed towards base station 57 in order that interference from signals associated with base station 58 are reduced.

As already mentioned, subscribers close to the base station (within the inner sector) have bearers of any of the frequencies available whereas subscribers in the outermost sector (e.g. between boundary 43 and the edge of the cell) have fewer available bearers. This means that subscribers far from the base station are disadvantaged in terms of the number of available channels. However, the number of available channels for these subscribers is increased by making available channels from any adjacent base station. For example, the subscriber 56 can increase the number of available channels by using those from either sector 59 or 60.

The subscriber stations can be equipped with two or more directional antennas, each directed towards a different base station. By doing this, subscribers such as the one at 56 in FIG. 5 have access to more channels because they can use channels from more than one base station. This is done by changing which of the subscriber antennas is used. Alternatively, a subscriber antenna system can be used in which one antenna assembly is used which has a two or more antenna beams. It is also possible to use a subscriber system with a moveable antenna beam for example, by using a Rotman lens beamformer, by using a rotatable antenna assembly or by using several antennas each of less than 360° beamwidth that are arranged to cover 360°. Such an arrangement is described in a co-pending application number 9715478.5 of the Applicant.

When a directional antenna is used this takes time to install, because the antenna has to be directed in a way that enables communication of the desired quality to be achieved with the preferred base station. This often involves monitoring the site itself using special equipment and is time consuming and expensive. By using several antennas which together give substantially omni directional cover, this installation process is greatly simplified. For example, four directional antennas can be used, and arranged to give effectively omni-directional coverage around the subscriber assembly. A particular embodiment could comprise four 120° antennas arranged to give effectively 360° cover. The antenna assembly is simply installed (for example on a roof top) without being specially directed and then the communications system is able to "direct" the subscriber antenna by choosing which antenna beam to use after installation. This direction process can be controlled by an OAM (Operations, Administration and Maintenance) centre in the communications network or alternatively can be controlled by apparatus within the subscriber system itself. Moveable antenna beams can also be used in this way.

In another embodiment the capacity of the downlink channels only is increased by varying the power levels of these channels as previously described. This is especially advantageous for situations when more capacity on the downlink channels is required than on the uplink channels. For example, internet access by a subscriber involves the transmission of relatively large amounts of data on the downlink channels (such as web pages) whereas the uplink channels are used to send relatively small requests from the subscriber to the base station. In this type of situation, and when packet data is being transmitted, it is possible to use channels that have a lower carrier to interference level ratio than would be acceptable for a voice channel. This is because an error detecting method can be used to trigger retransmission of data that was not transmitted accurately enough. For example, an ARQ (automatic transmission request) system can be used. This means that the capacity of the communications system can be even further increased by using channels of different power levels in combination with an error detecting method to allow signals to be transmitted using channels of lower carrier to interference level ratio where possible.

Also, there is an inbuilt asymmetry in carrier to interference level ratios for uplink and downlink channels which can be exploited. That is, for downlink channels in the type of communications system illustrated in any of FIGS. 1 to 5, there is less interference than there is for corresponding uplink channels. Because there is less interference on the downlink channels in the worst case, the capacity of these channels can be further "stretched", by using the method of different power levels as described above.

Figure 6:
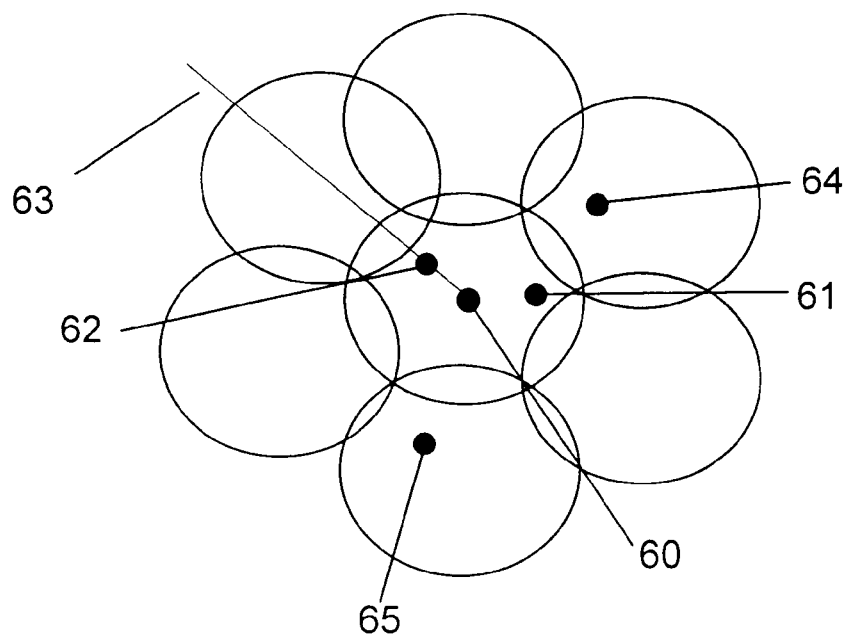
FIG. 6 illustrates how the inbuilt asymmetry in carrier to interference level ratios for the uplink and downlink channels arises.
Figure 7:
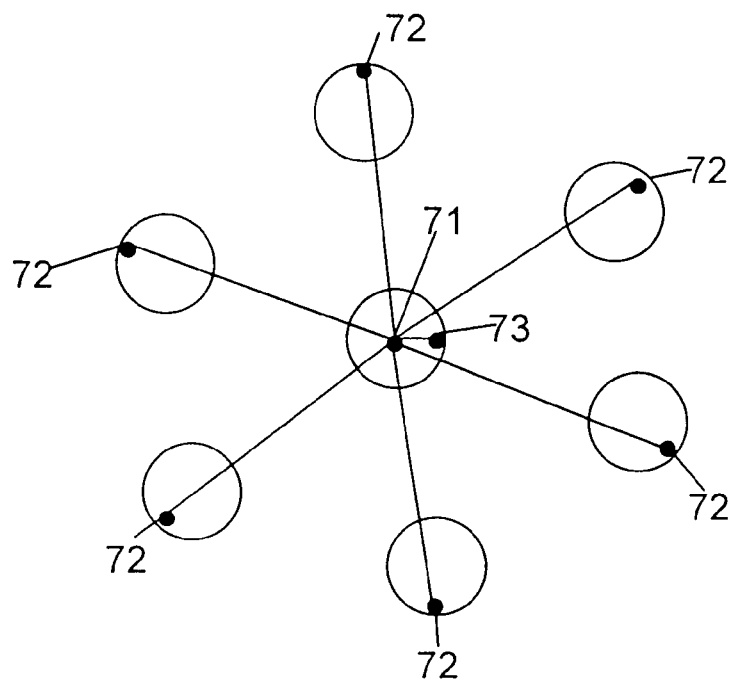
FIG. 7 also illustrates how the inbuilt asymmetry in carrier to interference level ratios for the uplink and downlink channels arises.

FIG. 6 illustrates how the inbuilt asymmetry in carrier to interference level ratios for the uplink and downlink channels arises. Consider an uplink channel from subscriber 61 to base station 60. For this channel, interference can come from several other subscribers 64, 65 in other cells, who are using channels of the same or similar frequency. Once the base station receives these signals of similar frequency it cannot easily tell which subscriber station they came from. However, for a downlink channel, such as that from base station 60 to subscriber 62, interference is only experienced by other subscribers in the same "line of sight" 63 from base station 60 as subscriber 62. This is because the subscriber antenna assemblies in a fixed wireless access system are directional whereas for the base station the antenna assembly is typically substantially omni-directional. FIG. 7 also illustrates how the inbuilt asymmetry in carrier to interference level ratios for the uplink and downlink channels arises. For base station 71 there are up to 6 uplink interference sources 72 but for subscriber 73 there is only 1 downlink interference source.

Orthogonal polarisations for the different channels can be used to reduce interference. For fixed radio access systems, subscriber antennas are normally situated out of the worst effects of clutter and polarisation mixing effects are reduced. This makes the use of orthogonal polarisation of some value to improve the average carrier to interference level ratio. This method may also be employed in conjunction with the proposed ideas.

A range of applications are within the scope of the invention. These include situations where it is required to allocate channels in a fixed wireless access communications system for either or both of up and down link channels. For example, for internet access and for transmission of packet data.

What is claimed is:

1. A method of radio channel allocation in a fixed wireless access communications network, said network comprising:
   (i) a base station;
   (ii) a plurality of subscriber stations; and wherein the base station and the subscriber stations are adapted such that communication between the base station and the subscriber stations is achieved in use, using one of a number of radio channels, each radio channel having different transmission characteristics; and wherein each radio channel can be transmitted at one of at least two power levels determining a set of suitable radio channels; said method comprising the steps of:
      allocating a radio channel for use in communicating between one of the subscriber stations and the base stations selecting the lowest acceptable power level which provides an adequate signal quality.

2. A method of radio channel allocation as claimed in claim 1, wherein the channel transmission characteristics are selected from the group comprising modulation type, frequency and polarisation mode.

3. A method of radio channel allocation as claimed in claim 1 wherein said method further comprises the step of allocating the radio channel by choosing an available radio channel with the lowest power level.

4. A method of radio channel allocation as claimed in claim 1 wherein an adequate signal quality is provided when a carrier to interference level ratio above a predetermined value.

5. A method of radio channel allocation as claimed in claim 1 wherein the subscriber stations of said communications network are located within a cell comprising a geographical area around the base station and said communications network further comprises a second cell adjacent the first cell; a second base station located within the second cell; and a plurality of second subscriber stations located within the second cell and wherein the second base station and the second subscriber stations are adapted such that communication between the second base station and the second subscriber stations is achieved in use, using one of a number of second radio channels, each second radio channel having different transmission characteristics; and wherein each second radio channel can be transmitted at one of at least two power levels and wherein the radio channels transmitted at the lowest power have substantially the same frequencies in each cell.

6. A method of radio channel allocation as claimed in claim 5 wherein the radio channels transmitted at the highest power have substantially different frequencies in each cell.

7. A method of radio channel allocation as claimed in claim 1 wherein said selected subscriber station comprises a subscriber antenna with at least one moveable antenna beam.

8. A method of radio channel allocation as claimed in claim 1 wherein said selected subscriber station comprises two or more directional antennas.

9. A method of radio channel allocation as claimed in claim 1 wherein the radio channels are downlink radio channels.

10. A method of radio channel allocation as claimed in claim 1 which further comprises the steps of:
    (i) transmitting packet data over the allocated channel;
    (ii) checking the transmitted data for errors;
    (iii) retransmitting any transmitted data in which errors are detected.

11. An apparatus for radio channel allocation in a fixed wireless access communications network said network comprising
    (i) a base station;
    (ii) a plurality of subscriber stations; and wherein the base station and the subscriber stations are adapted such that communication between the base station and the subscriber stations is achieved in use, using one of a number of radio channels, each radio channel having different transmission characteristics; and wherein each radio channel can be transmitted at one of at least two power levels,
    said apparatus comprising:
      an allocator arranged to determine a set of suitable radio channels and to allocate a radio channel for use in communicating between one of the subscriber stations and the base station wherein the allocator is operable to select the lowest acceptable power level which provides an adequate signal quality.

12. A fixed wireless access communications network comprising:
    (i) a base station;
    (ii) a plurality of subscriber stations, wherein the base station and the subscriber stations are adapted such that communication between the base station and the subscriber stations is achieved in use, using one of a number of radio channels, each radio channel having different transmission characteristics; and
    wherein each radio channel is transmitted at one of at least two power levels,
    (iii) an allocator arranged to determine a set of suitable radio channels and to allocate a radio channel for use in communicating between one of the subscriber stations and the base station wherein the allocator is operable to select the lowest acceptable power level which provides an adequate signal quality.

13. An apparatus according to claim 11 wherein transmission occurs at two power levels.

14. An apparatus according to claim 11 wherein power levels are variable between minimum and maximum values.

15. An apparatus according to claim 11 wherein power control is determined depending on the distance between the base station and the subscriber.

16. An apparatus according to claim 11 wherein the channel transmission characteristics are selected from the group comprising modulation type, frequency and polarisation mode.

* * * * *